(12) United States Patent
Choi et al.

(10) Patent No.: US 12,450,791 B1
(45) Date of Patent: Oct. 21, 2025

(54) METHOD FOR GENERATING DEFORMED IMAGES FOR ANOMALY DETECTION AND COMPUTING DEVICE FOR PERFORMING THE SAME

(71) Applicant: CHUNG ANG UNIVERSITY INDUSTRY ACADEMIC COOPERATION FOUNDATION, Seoul (KR)

(72) Inventors: Jong Won Choi, Gyeongsangnam-do (KR); Min Gyu Lee, Seoul (KR); Do Hee Kim, Seoul (KR); Yu Jeong Oh, Gyeonggi-do (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 19/058,168

(22) Filed: Feb. 20, 2025

(30) Foreign Application Priority Data

Sep. 2, 2024 (KR) .................. 10-2024-0118846

(51) Int. Cl.
*G06T 11/00* (2006.01)
*G06F 17/10* (2006.01)
(Continued)

(52) U.S. Cl.
CPC ............ *G06T 11/001* (2013.01); *G06F 40/40* (2020.01); *G06T 9/00* (2013.01)

(58) Field of Classification Search
CPC . G06T 11/001; G06T 9/00; G06T 7/00; G06T 5/006; G06T 5/08; G06T 7/40;
(Continued)

(56) References Cited

U.S. PATENT DOCUMENTS

2021/0264212 A1\* 8/2021 Paik ................. G16H 15/00
2021/0374642 A1\* 12/2021 Bronicki ............ G06Q 30/0643
(Continued)

FOREIGN PATENT DOCUMENTS

JP 2022-037623 A 3/2022
KR 10-2023-0061891 A 5/2023

OTHER PUBLICATIONS

Chen Qiu et al., "Text-driven prompt generation for vision-language models in federated learning", Computer vision and Pattern Recognition, Oct. 9, 2023, DOI: 10.48550/arXiv.2310.06123 (Year: 2023).\*
(Continued)

*Primary Examiner* — Wesner Sajous
(74) *Attorney, Agent, or Firm* — The PL Law Group, PLLC (57) ABSTRACT

A method for generating deformed images includes receiving an original image including a non-defective object and augmenting the original image into a plurality of images, receiving the plurality of augmented original images and generating a deformed image from each of the augmented original images, receiving a name of an object included in the original image as text and generating an optimal prompt based on the name of the object, and determining whether to store the deformed image in a non-defective data pool based on the optimal prompt and the plurality of generated deformed images.

13 Claims, 6 Drawing Sheets

(51) Int. Cl.
*G06F 40/40* (2020.01)
*G06N 3/08* (2023.01)
*G06T 9/00* (2006.01)

(58) Field of Classification Search
CPC .......... G06F 40/40; G06F 17/10; G06F 7/544; G06N 3/08; G06N 3/09–098; G06N 3/045; G06N 3/0455; G06N 5/00; G06V 10/70–75
See application file for complete search history.

(56) References Cited

U.S. PATENT DOCUMENTS

| | | | |
|---|---|---|---|
| 2021/0374763 A1* | 12/2021 | Bronicki | G06Q 30/0639 |
| 2021/0374836 A1* | 12/2021 | Bronicki | H04N 7/181 |
| 2023/0281549 A1* | 9/2023 | Bronicki | G06Q 30/0208 705/14.11 |
| 2024/0112776 A1* | 4/2024 | Paik | G06V 10/95 |

OTHER PUBLICATIONS

Mingqing Wang et al., "Unsupervised Anomaly Detection with Local-Sensitive VQVAE and Global-Sensitive Transformers", Computer Vision and Pattern Recognition, Mar. 29, 2023, DOI: 10.48550/arXiv.2303.17505.

Chen Qiu et al., "Text-driven Prompt Generation for Vision-Language Models in Federated Learning", Computer Vision and Pattern Recognition, Oct. 9, 2023, DOI: 10.48550/arXiv.2310.06123.

* cited by examiner

FIG. 1

DECISION BOUNDARY BASED ON
NON-DEFECTIVE DATA

FIG. 6

METHOD FOR GENERATING DEFORMED IMAGES FOR ANOMALY DETECTION AND COMPUTING DEVICE FOR PERFORMING THE SAME

CROSS-REFERENCE TO RELATED APPLICATION AND CLAIM OF PRIORITY

This application claims the benefit under 35 USC § 119 of Korean Patent Application No. 10-2024-0118846, filed on Sep. 2, 2024, in the Korean Intellectual Property Office, the entire disclosure of which is incorporated herein by reference for all purposes.

BACKGROUND

1. Technical Field

Embodiments of the present disclosure relate to a technique for generating deformed images for anomaly detection.

2. Description of Related Art

Anomaly detection is a task of identifying abnormal components in fields such as industrial manufacturing. For example, anomaly detection may be a task of detecting defects or failures in industrial parts. Anomaly detection is performed by learning the distribution of defect-free data to identify defects. In this case, since the efficiency of anomaly detection varies depending on the amount and quality of available non-defective data (i.e., normal data), a decision boundary based on non-defective data requires a balance between the general characteristics and diversity of non-defects.

Figure 1:
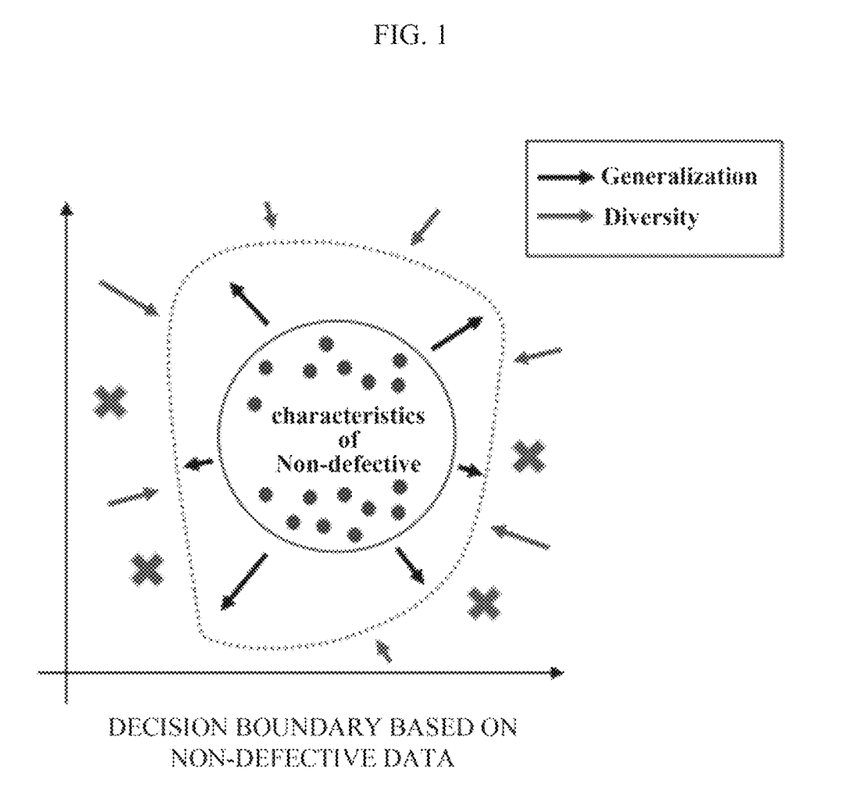
FIG. 1 is a diagram showing a decision boundary formed based on non-defective data.

That is, as shown in FIG. 1, if a decision boundary is formed by reflecting only the general characteristics of non-defects, the decision boundary becomes too narrow, and if the diversity of non-defects is excessively reflected, the decision boundary becomes too wide, and thus the boundary between normal and defects becomes ambiguous.

Examples of related art include Korean unexamined patent application publication No. 10-2023-0061891 (2023 May 9).

SUMMARY

Embodiments of the present disclosure provides a method for generating a deformed image for anomaly detection that can generate a deformed image, which is non-defective data, from an original image, which is non-defective data, and a computing device for performing the same.

According to an aspect of the present disclosure, there is provided a method for generating deformed images which is a method performed on a computing device that includes one or more processors and a memory storing one or more programs executed by the one or more processors and including receiving an original image including a non-defective object and augmenting the original image into a plurality of images, receiving the plurality of augmented original images and generating a deformed image from each of the augmented original images, receiving a name of an object included in the original image as text and generating an optimal prompt based on the name of the object, and determining whether to store the deformed image in a non-defective data pool based on the optimal prompt and the plurality of generated deformed images.

In the augmenting of the original image into the plurality of images, the original image may be augmented into the plurality of images by changing a color or texture of the object in the original image.

The generating of the deformed image may include inputting the augmented original images into a first encoder to extract respective embedding vectors, assigning index values to the embedding vectors and storing the embedding vectors in a code book, calculating an average for each of the embedding vectors extracted from the first encoder, calculating a variance of the embedding vectors in the code book, calculating a quantized vector for each augmented original image by multiplying the calculated variance by noise and then adding the calculated average to the multiplication result, and inputting the quantized vector for each augmented original image into a decoder to generate a deformed image for each augmented original image.

The generating of the deformed image may further include extracting an embedding vector from each of the regenerated augmented original images in the first encoder when the augmented original images are regenerated from the original images and input to the first encoder, and determining whether to use the embedding vector extracted from the first encoder as is or to replace the embedding vector with the embedding vector stored in the code book by comparing the embedding vector extracted from the first encoder with each of the embedding vectors stored in the code book.

In the determining, when a difference between the embedding vector extracted from the first encoder and the embedding vector stored in the codebook is greater than or equal to a preset threshold value, the corresponding embedding vector extracted from the first encoder may be replaced with the embedding vector stored in the codebook.

The generating of the optimal prompt may include obtaining a plurality of related words associated with the name of the object, generating a plurality of candidate prompts based on the name of the object and the plurality of related words, inputting the original image to a pre-trained second encoder to extract a first image embedding, inputting the plurality of candidate prompts to the second encoder to extract first text embeddings corresponding to the candidate prompts, and selecting an optimal prompt among the candidate prompts based on the first image embedding and the first text embeddings.

The selecting of the optimal prompt may include selecting, among the first text embeddings, a first text embedding whose measured distance value with respect to the first image embedding is within a preset distance as a positive group, calculating a similarity between the first image embedding and each of the first text embeddings set as the positive group, and extracting the first text embedding having the largest calculated similarity value among the first text embeddings set as the positive group, and selecting a candidate prompt corresponding to the extracted first text embedding as an optimal prompt.

The determining of whether to store the deformed image in the non-defective data pool may include inputting the optimal prompt to a pre-trained third encoder to extract a second text embedding, inputting each of the generated plurality of deformed images to the third encoder to extract second image embeddings corresponding to each of the deformed images, calculating a similarity between the second text embedding and each of the second image embeddings, and determining whether to store the deformed image in the non-defective data pool based on the similarity between the second text embedding and each of the second image embeddings.

According to another aspect of the present disclosure, there is provided a computing device which includes one or more processors, a memory, and one or more programs and in which the one or more programs are stored in the memory and configured to be executed by the one or more processors, and the one or more programs include an instruction for receiving an original image including a non-defective object and augmenting the original image into a plurality of images, an instruction for receiving the plurality of augmented original images and generating a deformed image from each of the augmented original images, an instruction for receiving a name of an object included in the original image as text and generating an optimal prompt based on the name of the object, and an instruction for determining whether to store the deformed image in a non-defective data pool based on the optimal prompt and the plurality of generated deformed images.

According to the embodiment of the present disclosure, it is possible to generate the deformed image that has a similar shape to the original image, which is non-defective data, but has visual dispersion. In addition, it is possible to select the optimal prompt and determine whether to store the generated deformed image based on the optimal prompt in the non-defective data pool.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. Additionally, terms to be described later are terms defined in consideration of functions in the present disclosure, which may vary according to the intention or custom of users or workers. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In addition, the terms "first", "second", etc. may be used to describe various components, but the components should not be limited by the terms. The terms may be used to distinguish one component from another. For example, without departing from the scope of the present disclosure, a first component may be referred to as a second component, and similarly, a second component may also be referred to as a first component.

Figure 2:
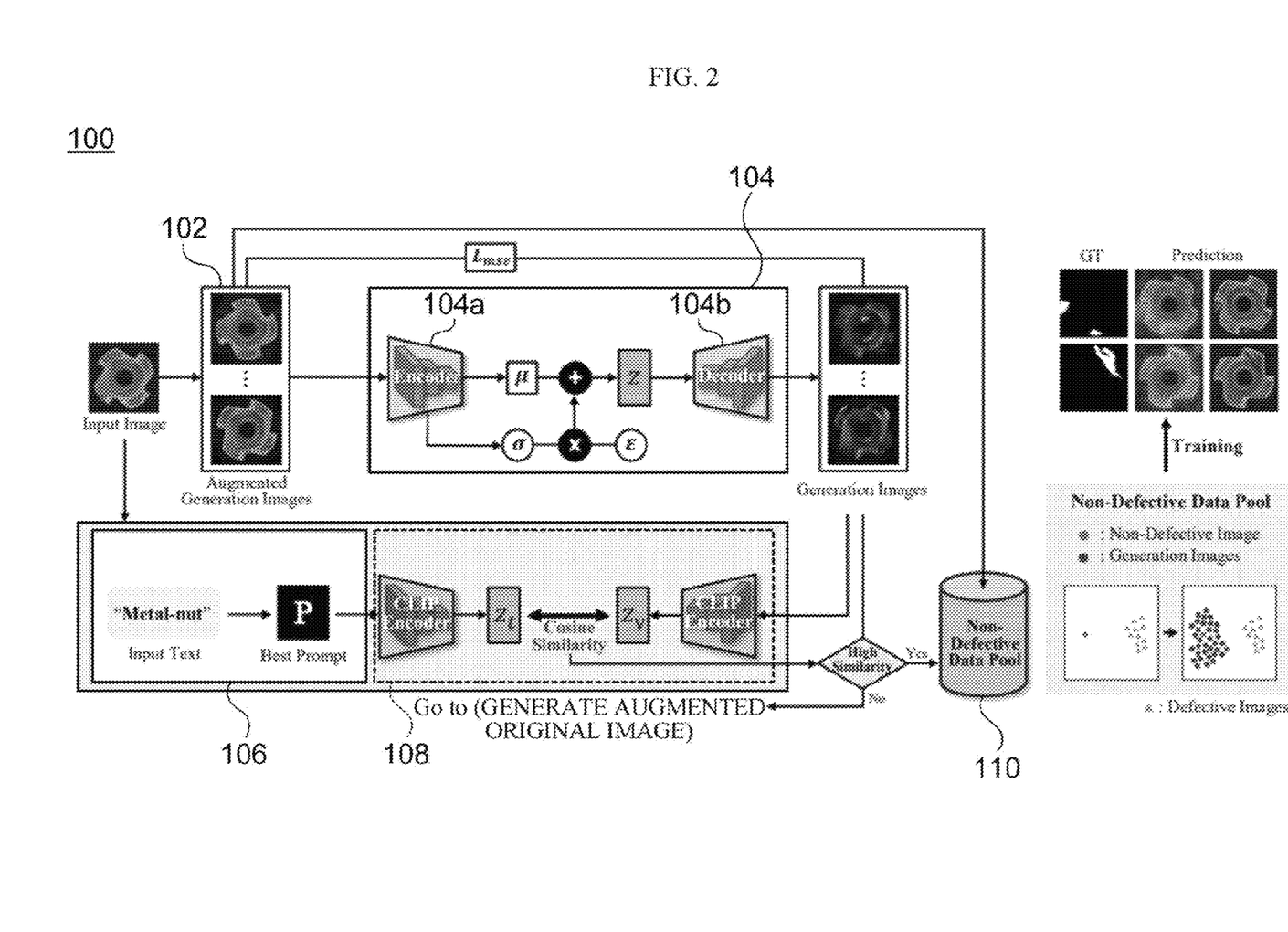
FIG. 2 is a diagram showing a framework of a text-based device for generating deformed images for anomaly detection according to an embodiment of the present disclosure.

FIG. 2 is a diagram showing a framework of a text-based device for generating deformed images for anomaly detection according to one embodiment of the present disclosure.

Referring to FIG. 2, a device for generating deformed images 100 may include an image augmenter 102, an image generator 104, a prompt generator 106, and a knowledge integrator 108.

The device for generating deformed images 100 may receive an original image and generate a deformed image from the original image. Here, the original image is non-defective data (i.e., a normal image). That is, the original image is an image that includes a defect-free object. In one embodiment, the original image may be an image of a defect-free industrial part, but is not limited thereto. In addition, the deformed image generated by the device for generating deformed images 100 is also different from the original image, but is a non-defective image. That is, the device for generating deformed images 100 may generate a deformed image, which is another non-defective image, from the original image, which is a non-defective image. The device for generating deformed images 100 may generate the deformed image from the original image based on artificial neural network technology.

Figure 3:
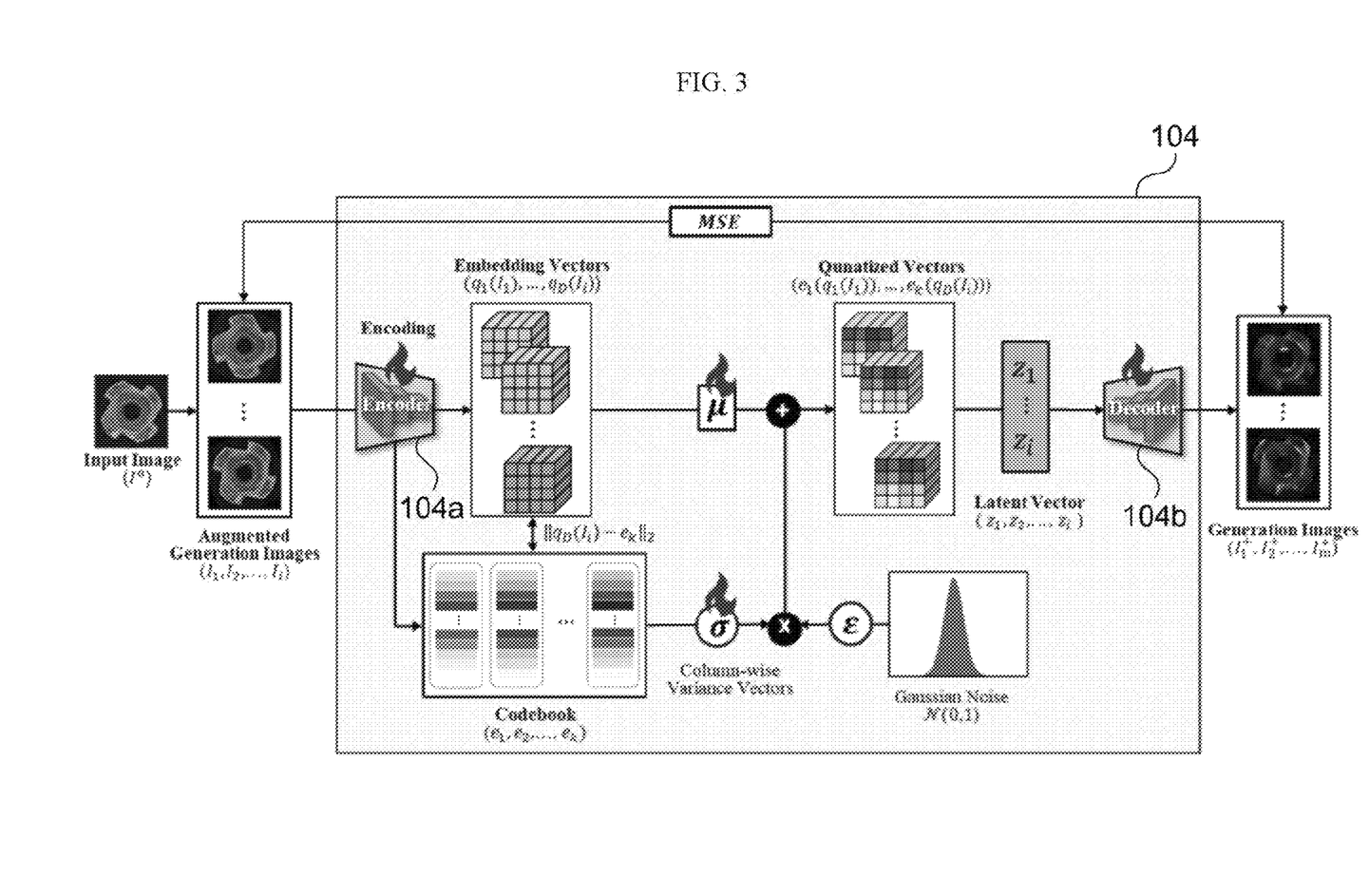
FIG. 3 is a diagram for describing an operation of an image augmenter and an image generator in a framework of a device for generating deformed images according to an embodiment of the present disclosure.

FIG. 3 is a diagram for describing the operation of the image augmenter 102 and the image generator 104 in the framework of the device for generating deformed images according to one embodiment of the present disclosure.

Referring to FIG. 3, the image augmenter 102 may receive an original image $I^o$ and augment the original image into a plurality of images $I_1, I_2, \ldots, I_i$. That is, the image augmenter 102 may receive an original image, which is non-defective data, and augment the original image into a plurality of images. The image augmenter 102 may augment the original image into a plurality of images without changing the appearance of the original image. In one embodiment, the image augmenter 102 may augment the original image into a plurality of images without changing the appearance of the original image by changing the color of an object or changing the texture in the original image.

The image generator 104 may receive the augmented original image and generate a deformed image. The image generator 104 may include a first encoder 104a and a decoder 104b.

The first encoder 104a may receive each of the augmented original images. The first encoder 104a may extract each of embedding vectors $q_1(I_1), q_2(I_2), \ldots q_D(I_i)$ by embedding each of the augmented original images. In addition, the first encoder 104a may assign index values to the embedding vectors and store the embedding vectors in a codebook. That is, in order to refer to each embedding vector, an index value may be assigned to each embedding vector and embedding vector may be stored in the codebook.

The image generator 104 may calculate a mean μ of each of the embedding vectors extracted from the first encoder 104a. The image generator 104 may calculate a variance σ of the embedding vectors in the code book. The image generator 104 may add random noise ε to the variance σ of the embedding vectors in the code book. Here, the noise ε may be noise of a Gaussian distribution, and a random value may be sampled from the noise of the Gaussian distribution. Here, by adding the random noise ε to the variance σ of the embedding vectors in the code book, diversity may be provided to the deformed image to be generated by the decoder 104b.

The image generator 104 may generate a quantized vector for each augmented original image by adding the mean μ of each embedding vector to a value obtained by multiplying the variance σ of the embedding vectors in the codebook by the noise ε. Here, the quantized vector may be a latent vector for each augmented original image.

The decoder 104b may receive the quantized vector for each augmented original image and generate each of deformed images $I_1^+, I_2^+, \ldots, I_m^+$ for augmented original images. The decoder 104b may be trained to minimize a difference between the augmented original image and the deformed image. In one embodiment, the decoder 104b may be trained to minimize the difference between the augmented original image and the deformed image using a mean squared error (MSE) loss function.

Figure 4:
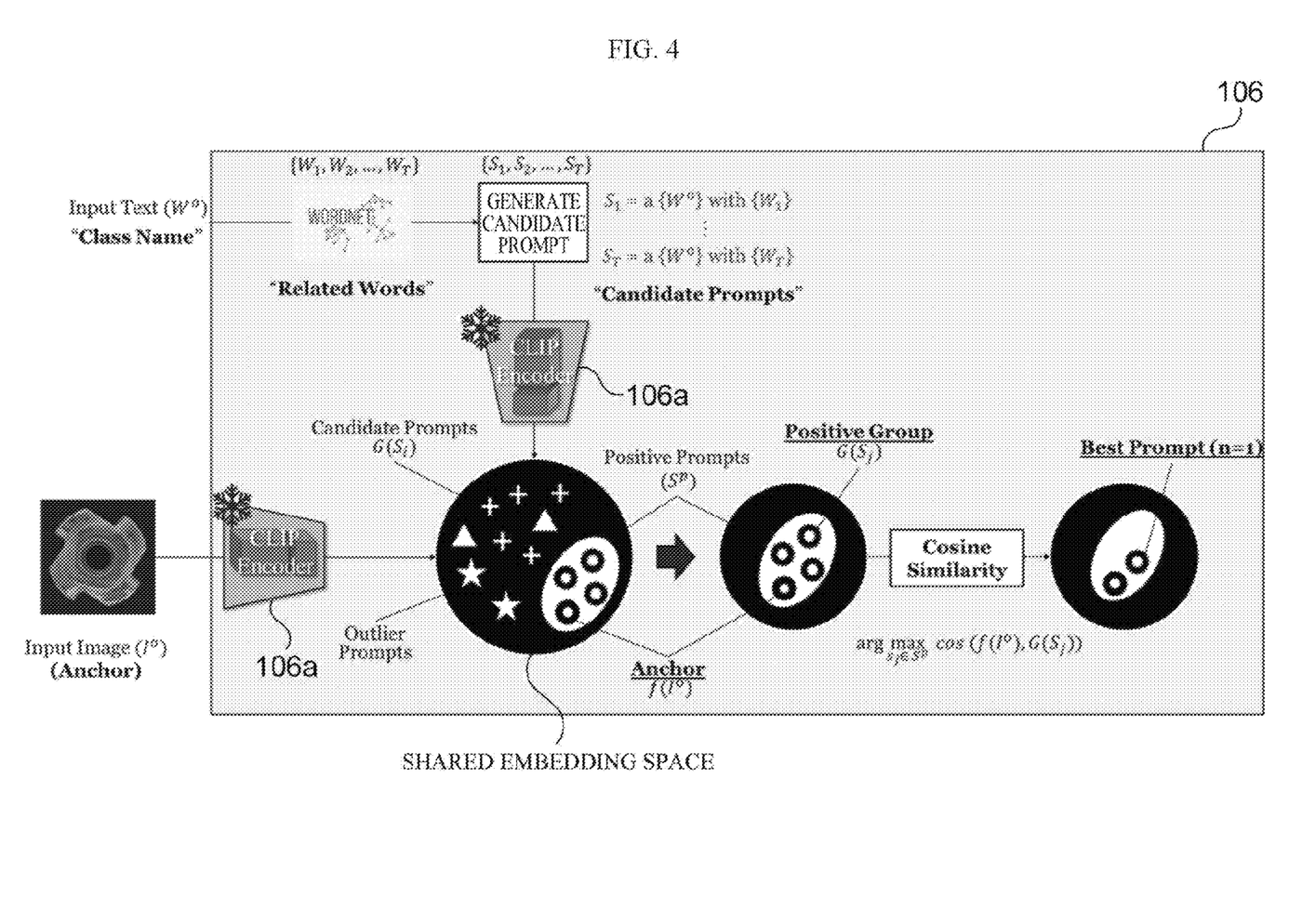
FIG. 4 is a diagram for describing an operation of a prompt generator in the framework of the device for generating deformed images according to an embodiment of the present disclosure.

The prompt generator 106 may generate an optimal prompt for an object included in the original image. FIG. 4 is a diagram for describing the operation of the prompt generator 106 in the framework of the device for generating deformed images according to one embodiment of the present disclosure.

Referring to FIG. 4, the prompt generator 106 may receive a name $W^o$ of the object included in the original image $I^o$ as text. Here, the object may be any object that is a target of non-defects. The prompt generator 106 may extract a plurality of words associated with the name of the corresponding object. In one embodiment, the prompt generator 106 may extract related words $W_1, W_2, \ldots W_T$ corresponding to the name of the object using a word database such as WordNet.

Here, the related words are words that are different from the name of the object but have a semantic relevance to the name of the object, for example, words that have a similar or identical meaning to the name of the object, words that have a superior or inferior relationship to the name of the object, words that have a partial or complete relationship to the name of the object, etc.

The prompt generator 106 may generate a plurality of candidate prompts $S_1, S_2, \ldots S_T$ based on the name of the object and the related words corresponding to the name of the object. Here, the candidate prompt may be expressed as $S_t = a \{W^o\}$ with $\{W_t\}$.

The prompt generator 106 may include a second encoder 106a. The second encoder 106a may be a neural network model trained to match images and texts. That is, the second encoder 106a may be a neural network model trained to receive images and texts and match an image embedding and text embeddings in a shared embedding space. The second encoder 106a may be trained to predict which image and text pair matches in the shared embedding space. Here, the shared embedding space may mean a multimodal embedding space where the image embeddings and the text embeddings coexist. In one embodiment, the second encoder 106a may be an encoder of contrastive language image pre-training (CLIP), but is not limited thereto.

The prompt generator 106 may input the original image $I^o$ into the pre-trained second encoder 106a to extract a first image embedding. In addition, the prompt generator 106 may input text of the candidate prompts into the pre-trained second encoder 106a to extract the first text embeddings corresponding to the candidate prompts. Here, the extracted first image embedding and first text embeddings may be located in the shared embedding space.

The prompt generator 106 may calculate a distance between the first image embedding and each of the first text embeddings. In one embodiment, the prompt generator 106 may measure L2 Norm (L2 distance) between the first image embedding and each of the first text embeddings using the first image embedding as an anchor. The prompt generator 106 may select, among the first text embeddings, a first text embedding whose measured distance value from the first image embedding is within a preset distance as a positive group. Here, by selecting the positive group through distance measurement between the first image embedding and the first text embeddings, the amount of computation required to select an optimal prompt can be reduced.

The prompt generator 106 may calculate a similarity between the first image embedding and each of the first text embeddings selected as the positive group. In one embodiment, the prompt generator 106 may calculate cosine similarity between the first image embedding and each of the first text embeddings selected as the positive group.

The prompt generator 106 may extract the first text embedding having the largest calculated cosine similarity value among the first text embeddings selected as the positive group, and select the candidate prompt corresponding to the extracted first text embedding as the optimal prompt. Here, the prompt generator 106 may select an optimal prompt P through Equation 1 below.

$$P = \arg\max_{S_j \in S^P} \cos(f(I^O), G(S_j)) \quad \text{[Equation 1]}$$

Figure 5:
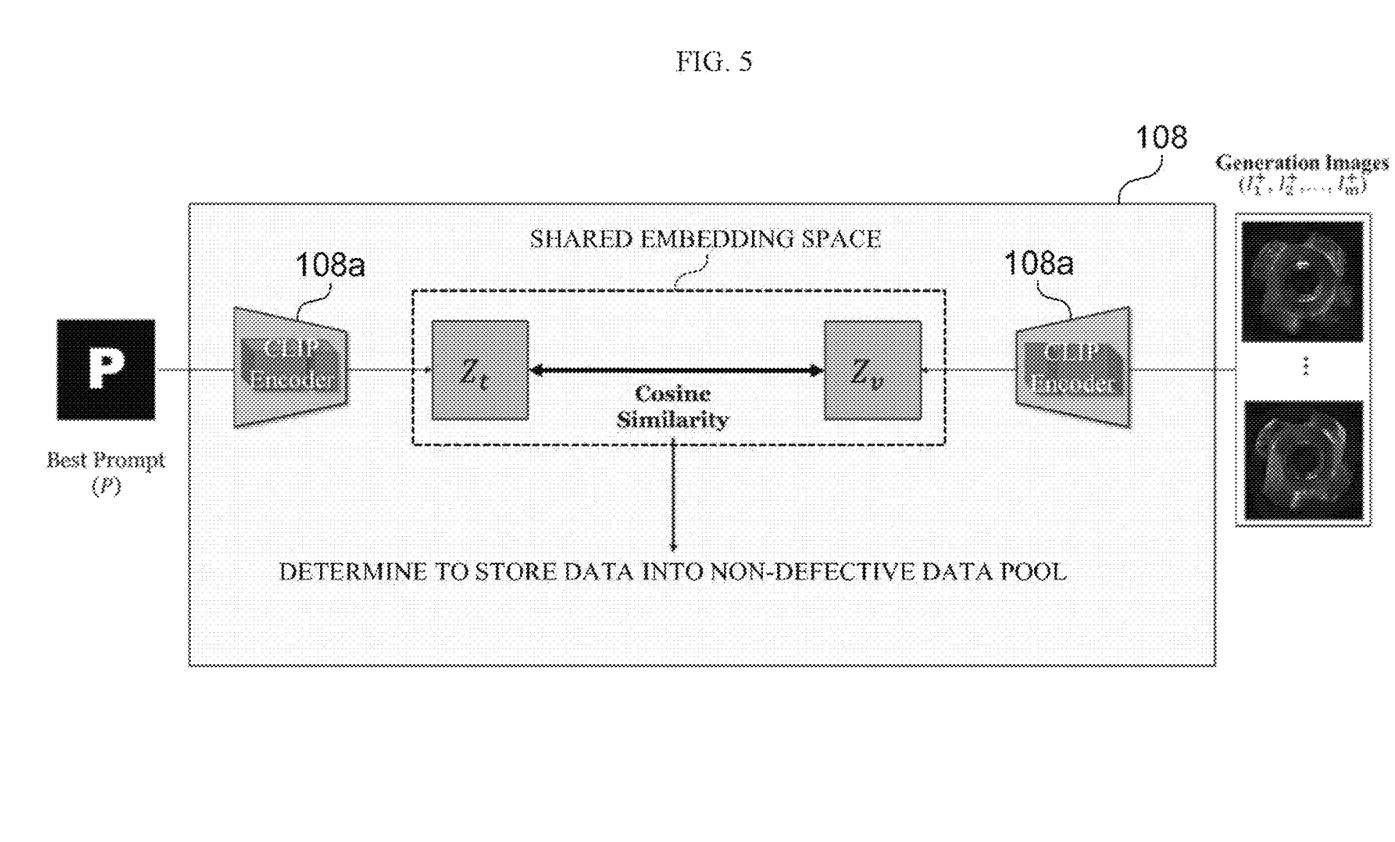
FIG. 5 is a diagram for describing the operation of a knowledge integrator in the framework of the device for generating deformed images according to the embodiment of the present disclosure.

$S^P$: positive group
$G(S_j)$: j-th first text embedding belonging to positive group
$f(I^o)$: first image embedding
$\cos(f(I^o), G(S_j))$: function for calculating cosine similarity between f(Io) and $G(S_j)$
argmax: function for calculating maximum value The knowledge integrator 108 may receive the deformed images $I_1^+, I_2^+, \ldots, I_m^+$ generated by the image generator 104 and the optimal prompt P output from the prompt generator 106. The knowledge integrator 108 may determine whether to store the deformed images in a non-defective data pool 110 based on the similarity between the optimal prompt and each of the deformed images. FIG. 5 is a diagram for describing the operation of the knowledge integrator 108 in the framework of the device for generating deformed images according to one embodiment of the present disclosure.

Referring to FIG. 5, the knowledge integrator 108 may include a third encoder 108a. The third encoder 108a may be a neural network model trained to match images and texts. That is, the third encoder 108a may be a neural network model trained to receive images and texts respectively and match image embeddings and text embeddings in the shared embedding space. The same encoder as the second encoder 106a may be used as the third encoder 108a. That is, for convenience of description, the third encoder 108a and the second encoder 106a are depicted as being distinct, but the same encoder may be used for the third encoder 108a and the second encoder 106a.

The knowledge integrator 108 may input the optimal prompt P received from the prompt generator 106 to the third encoder 108a to extract a second text embedding $z_t$. In addition, the knowledge integrator 108 may input the deformed images $I_1^+, I_2^+, \ldots, I_m^+$ generated by the image generator 104 to the third encoder 108a to extract second image embeddings $z_v^1$ corresponding to each deformed image. Here, the extracted second text embedding and the second image embeddings may be located in the shared embedding space.

The knowledge integrator 108 may calculate the similarity between the second text embedding and each of the second image embeddings. In one embodiment, the knowledge integrator 108 may calculate the cosine similarity between the second text embedding $z_t$ and each of the second image embeddings $z_v^1$.

The knowledge integrator 108 may extract, among the second image embeddings, second image embeddings whose cosine similarity with the second text embedding is greater than or equal to a preset threshold value, and may determine to store a deformed image corresponding to each of the extracted second image embeddings in the non-defective data pool 110.

The knowledge integrator 108 may determine to regenerate an augmented original image from the original image when the cosine similarity between each of the second image embeddings and the second text embedding is less than or equal to the preset threshold value, and this process may be repeated multiple times.

The knowledge integrator 108 may store the deformed image corresponding to the second image embedding whose cosine similarity is greater than or equal to the preset threshold value in the non-defective data pool 110. As this process is repeated multiple times, non-defective images are accumulated in the non-defective data pool 110, and through this, the decision boundary for the non-defective image may be set more clearly. In this case, the anomaly detection task can be effectively performed using the non-defective images.

Meanwhile, referring to FIG. 3 again, when the augmented original images from the original images are regenerated and input to the first encoder 104a, the first encoder 104a embeds each of the augmented original images and extracts each embedding vector. And, the image generator 104 may compare the extracted embedding vectors ($q_1(I_1)$, $q_2(I_2), \ldots q_D(I_i)$) with the embedding vectors $e_1, e_2, \ldots, e_k$ (k is the size of the code book) stored in the code book, respectively. Here, the embedding vectors stored in the code book are the embedding vectors extracted from the previously augmented original images.

The image generator 104 may compare the extracted embedding vectors with the embedding vectors stored in the code book, respectively, to determine whether to use the embedding vector extracted from the first encoder 104a as it is or to replace the extracted embedding vector with the embedding vector stored in the code book.

Specifically, the image generator 104 may calculate a difference $\|q_d(I) - e_k\|_2$ between the embedding vectors $q_d(I)$ extracted from the first encoder 104a and the embedding vectors $e_k$ stored in the code book, respectively. If the calculated difference is greater than or equal to the preset threshold value, the image generator 104 may replace the corresponding embedding vector extracted from the first encoder 104a with the embedding vector stored in the code book. If the calculated difference is less than a preset threshold value, the embedding vector extracted from the first encoder 104a may be used as is.

The image generator 104 may calculate an average for each of the embedding vectors extracted from the first encoder 104a or each of the replaced embedding vectors in the code book. That is, when calculating the average for each of the embedding vectors, the embedding vector extracted from the first encoder 104a may be used as is, or the embedding vector stored in the code book may be used instead of the embedding vector extracted from the first encoder 104a.

Here, the code book may be updated each time the entire process is repeated. In one embodiment, after the embedding vector extracted from the first encoder 104a is compared with the embedding vector stored in the codebook, the codebook may be updated with the embedding vectors extracted from the first encoder 104a (i.e., the embedding vectors for the secondly input augmented original image). The embedding vectors in the updated codebook may be compared with the embedding vectors for the thirdly input augmented original image.

In this way, by storing the embedding vectors of the previously augmented original images in the codebook and then comparing the embedding vectors stored in the codebook with the embedding vectors of the next augmented original images, the deformed image may be made to have a similar shape to the original image when generating the deformed image.

Figure 6:
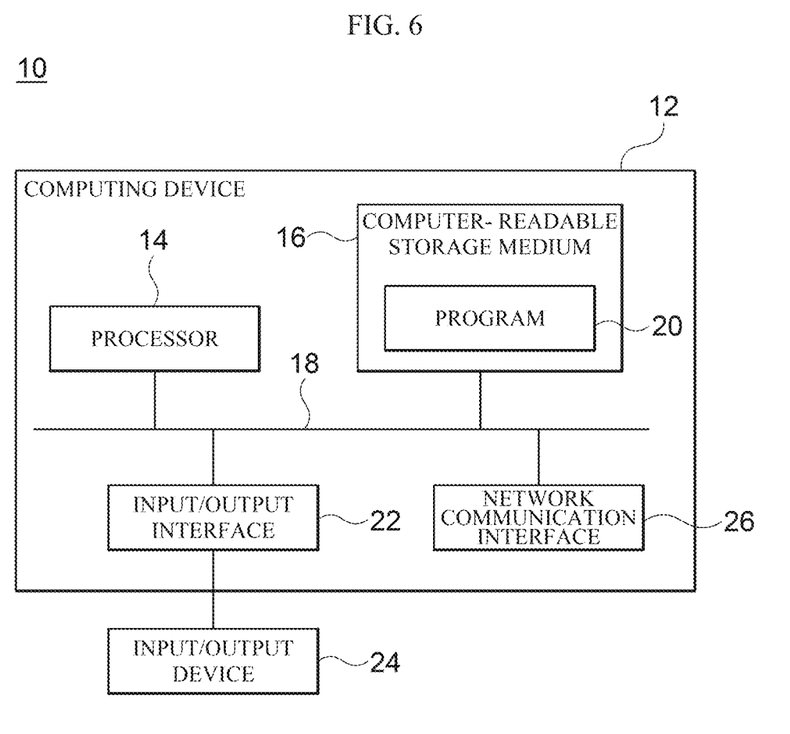
FIG. 6 is a block diagram for describing a computing environment including a computing device suitable for use in exemplary embodiments.

According to the disclosed embodiment, it is possible to generate the deformed image that is similar in shape to the original image, which is non-defective data, but has visual dispersion. In addition, it is possible to select an optimal prompt and determine whether to store the generated deformed image in the non-defective data pool based on the optimal prompt. FIG. 6 is a block diagram for describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the device for generating deformed images 100.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In an embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A method for generating deformed images performed on a computing device that includes one or more processors and a memory storing one or more programs executed by the one or more processors, the method comprising:
   receiving an original image including a non-defective object and augmenting the original image into a plurality of images;
   receiving the plurality of augmented original images and generating a deformed image from each of the augmented original images;
   receiving a name of an object included in the original image as text and generating an optimal prompt based on the name of the object; and
   determining whether to store the deformed image in a non-defective data pool based on the optimal prompt and the plurality of generated deformed images,
   wherein the generating of the deformed image includes:
      inputting the augmented original images into a first encoder to extract respective embedding vectors;
      assigning index values to the embedding vectors and storing the embedding vectors in a code book;
      calculating an average for each of the embedding vectors extracted from the first encoder;
      calculating a variance of the embedding vectors in the code book;
      calculating a quantized vector for each augmented original image by multiplying the calculated variance by noise and then adding the calculated average to the multiplication result; and
      inputting the quantized vector for each augmented original image into a decoder to generate a deformed image for each augmented original image.

2. The method of claim 1, wherein, in the augmenting of the original image into the plurality of images, the original image is augmented into the plurality of images by changing a color or texture of the object in the original image.

3. The method of claim 1, wherein the generating of the deformed image further includes:
   extracting an embedding vector from each of the regenerated augmented original images in the first encoder when the augmented original images are regenerated from the original images and input to the first encoder; and
   determining whether to use the embedding vector extracted from the first encoder as is or to replace the embedding vector with the embedding vector stored in the code book by comparing the embedding vector extracted from the first encoder with each of the embedding vectors stored in the code book.

4. The method of claim 3, wherein, in the determining, when a difference between the embedding vector extracted from the first encoder and the embedding vector stored in the codebook is greater than or equal to a preset threshold value, the corresponding embedding vector extracted from the first encoder is replaced with the embedding vector stored in the codebook.

5. A method for generating deformed images performed on a computing device that includes one or more processors and a memory storing one or more programs executed by the one or more processors, the method comprising:
   receiving an original image including a non-defective object and augmenting the original image into a plurality of images;
   receiving the plurality of augmented original images and generating a deformed image from each of the augmented original images;
   receiving a name of an object included in the original image as text and generating an optimal prompt based on the name of the object; and
   determining whether to store the deformed image in a non-defective data pool based on the optimal prompt and the plurality of generated deformed images,
   wherein the generating of the optimal prompt includes:
   obtaining a plurality of related words associated with the name of the object;
   generating a plurality of candidate prompts based on the name of the object and the plurality of related words;
   inputting the original image to a pre-trained second encoder to extract a first image embedding;
   inputting the plurality of candidate prompts to the second encoder to extract first text embeddings corresponding to the candidate prompts; and
   selecting an optimal prompt among the candidate prompts based on the first image embedding and the first text embeddings.

6. The method of claim 5, wherein the selecting of the optimal prompt includes:
   selecting, among the first text embeddings, a first text embedding whose measured distance value with respect to the first image embedding is within a preset distance as a positive group;

calculating a similarity between the first image embedding and each of the first text embeddings set as the positive group; and extracting the first text embedding having the largest calculated similarity value among the first text embeddings set as the positive group, and selecting a candidate prompt corresponding to the extracted first text embedding as an optimal prompt.

7. The method of claim 5, wherein the determining of whether to store the deformed image in the non-defective data pool includes:

inputting the optimal prompt to a pre-trained third encoder to extract a second text embedding;

inputting each of the generated plurality of deformed images to the third encoder to extract second image embeddings corresponding to each of the deformed images;

calculating a similarity between the second text embedding and each of the second image embeddings; and determining whether to store the deformed image in the non-defective data pool based on the similarity between the second text embedding and each of the second image embeddings.

8. A computing device comprising:

one or more processors;

a memory; and one or more programs, wherein the one or more programs are stored in the memory and configured to be executed by the one or more processors, and the one or more programs include:

an instruction for receiving an original image including a non-defective object and augmenting the original image into a plurality of images;

an instruction for receiving the plurality of augmented original images and generating a deformed image from each of the augmented original images;

an instruction for receiving a name of an object included in the original image as text and generating an optimal prompt based on the name of the object; and an instruction for determining whether to store the deformed image in a non-defective data pool based on the optimal prompt and the plurality of generated deformed images, wherein the instruction for generating the deformed image includes:

an instruction for inputting the augmented original images into a first encoder to extract respective embedding vectors;

an instruction for assigning index values to the embedding vectors and storing the embedding vectors in a code book;

an instruction for calculating an average for each of the embedding vectors extracted from the first encoder;

an instruction for calculating a variance of the embedding vectors in the code book;

an instruction for calculating a quantized vector for each augmented original image by multiplying the calculated variance by noise and then adding the calculated average to the multiplication result; and an instruction for inputting the quantized vector for each augmented original image into a decoder to generate a deformed image for each augmented original image.

9. The computing device of claim 8, wherein the instruction for generating the deformed image further includes:

an instruction for extracting an embedding vector from each of the regenerated augmented original images in the first encoder when the augmented original images are regenerated from the original images and input to the first encoder; and an instruction for determining whether to use the embedding vector extracted from the first encoder as is or to replace the embedding vector with the embedding vector stored in the code book by comparing the embedding vector extracted from the first encoder with each of the embedding vectors stored in the code book.

10. A computing device comprising:

one or more processors;

a memory; and one or more programs, wherein the one or more programs are stored in the memory and configured to be executed by the one or more processors, and the one or more programs include:

an instruction for receiving an original image including a non-defective object and augmenting the original image into a plurality of images;

an instruction for receiving the plurality of augmented original images and generating a deformed image from each of the augmented original images;

an instruction for receiving a name of an object included in the original image as text and generating an optimal prompt based on the name of the object; and an instruction for determining whether to store the deformed image in a non-defective data pool based on the optimal prompt and the plurality of generated deformed images, wherein the instruction for generating the optimal prompt includes:

an instruction for obtaining a plurality of related words associated with the name of the object;

an instruction for generating a plurality of candidate prompts based on the name of the object and the plurality of related words;

an instruction for inputting the original image to a pre-trained second encoder to extract a first image embedding;

an instruction for inputting the plurality of candidate prompts to the second encoder to extract first text embeddings corresponding to the candidate prompts; and an instruction for selecting an optimal prompt among the candidate prompts based on the first image embedding and the first text embeddings.

11. The computing device of claim 10, wherein the instruction for selecting the optimal prompt includes:

an instruction for selecting, among the first text embeddings, a first text embedding whose measured distance value with respect to the first image embedding is within a preset distance as a positive group;

an instruction for calculating a similarity between the first image embedding and each of the first text embeddings set as the positive group; and an instruction for extracting the first text embedding having the largest calculated similarity value among the first text embeddings set as the positive group, and selecting a candidate prompt corresponding to the extracted first text embedding as an optimal prompt.

12. The computing device of claim 10, wherein the instruction for determining whether to store the deformed image in the non-defective data pool includes:

an instruction for inputting the optimal prompt to a pre-trained third encoder to extract a second text embedding;

an instruction for inputting each of the generated plurality of deformed images to the third encoder to extract second image embeddings corresponding to each of the deformed images;

an instruction for calculating a similarity between the second text embedding and each of the second image embeddings; and an instruction for determining whether to store the deformed image in the non-defective data pool based on the similarity between the second text embedding and each of the second image embeddings.

13. A computer program stored in a non-transitory computer readable storage medium and including one or more instructions, which, when executed by a computing device including one or more processors, cause the computing device to perform:

receiving an original image including a non-defective object and augmenting the original image into a plurality of images;

receiving the plurality of augmented original images and generating a deformed image from each of the augmented original images;

receiving a name of an object included in the original image as text and generating an optimal prompt based on the name of the object; and determining whether to store the deformed image in a non-defective data pool based on the optimal prompt and the plurality of generated deformed images, wherein the generating of the deformed image includes:
  inputting the augmented original images into a first encoder to extract respective embedding vectors;
  assigning index values to the embedding vectors and storing the embedding vectors in a code book;
  calculating an average for each of the embedding vectors extracted from the first encoder;
  calculating a variance of the embedding vectors in the code book;
  calculating a quantized vector for each augmented original image by multiplying the calculated variance by noise and then adding the calculated average to the multiplication result; and
  inputting the quantized vector for each augmented original image into a decoder to generate a deformed image for each augmented original image.

* * * * *